(12) United States Patent
Nie et al.

(10) Patent No.: US 6,762,800 B1
(45) Date of Patent: Jul. 13, 2004

(54) CIRCUIT FOR CONTROLLING LUMINANCE SIGNAL AMPLITUDE

(75) Inventors: Xiaoning Nie, München (DE); Dirk Wendel, Unterhaching (DE); Maik Brett, Hofheim (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/786,451

(22) PCT Filed: Sep. 1, 1999

(86) PCT No.: PCT/DE99/02726

§ 371 (c)(1),
(2), (4) Date: Jun. 11, 2001

(87) PCT Pub. No.: WO00/13405

PCT Pub. Date: Mar. 9, 2000

(30) Foreign Application Priority Data

Sep. 1, 1998 (DE) .......................... 198 39 803

(51) Int. Cl.[7] .............................. H04N 5/20
(52) U.S. Cl. ...................... 348/687; 348/673; 348/678; 348/697; 345/77; 382/274; 358/520
(58) Field of Search ................ 348/687, 673, 348/678, 688, 697, 657, 644, 645, 674, 255, 380; 345/63, 77, 690; 382/274, 271; 358/520, 519

(56) References Cited

U.S. PATENT DOCUMENTS

| | | | | |
|---|---|---|---|---|
| 4,642,694 A | | 2/1987 | Yamagishi et al. | 358/236 |
| 4,975,773 A | | 12/1990 | Rabii | 358/169 |
| 5,134,490 A | * | 7/1992 | Neal | 348/687 |
| 5,276,436 A | * | 1/1994 | Shaw et al. | 345/603 |
| 5,298,915 A | * | 3/1994 | Bassetti, Jr. | 345/696 |
| 5,300,944 A | * | 4/1994 | Shapiro et al. | 345/88 |
| 5,721,559 A | | 2/1998 | Nagakubo | 345/63 |
| 5,793,442 A | * | 8/1998 | Wertman | 348/673 |
| 6,198,469 B1 | * | 3/2001 | Tjandrasuwita | 345/690 |

FOREIGN PATENT DOCUMENTS

| | | |
|---|---|---|
| EP | 0 547 882 A1 | 6/1993 |
| EP | 0 589 513 | 3/1994 |
| EP | 0 735 751 A2 | 10/1996 |
| EP | 0 735 751 A3 | 7/1999 |

* cited by examiner

Primary Examiner—Michael H. Lee
Assistant Examiner—Jean W. Désir
(74) Attorney, Agent, or Firm—Gauthier & Connors LLP

(57) ABSTRACT

The circuit takes into account whether the image on a screen is too bright, whether more than one specific number of pixels have a luminance value that is greater than a given peak value and whether this condition is met in more than one specific number of lines in a picture and in more than one specific number of successive images with one such number of lines.

17 Claims, 1 Drawing Sheet

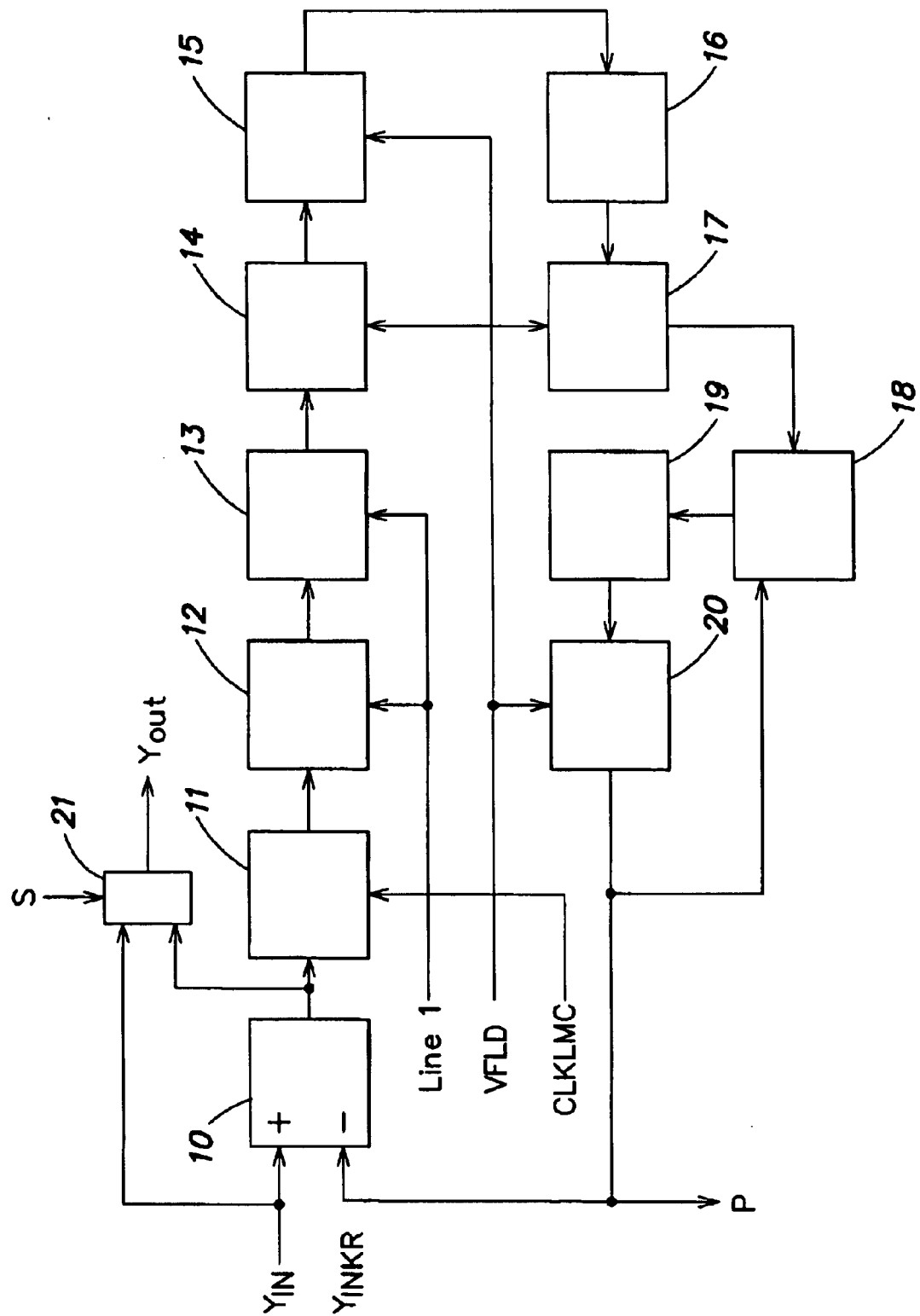

CIRCUIT FOR CONTROLLING LUMINANCE SIGNAL AMPLITUDE

BACKGROUND OF THE INVENTION

The invention relates to the field of video systems, and in particular to a circuit for controlling luminance signal amplitudes for application in a video system.

Video and television systems generally have an automatic luminance control (brightness control), which controls the average overall brightness in dependence on the brightest positions of a picture. The primary purpose of automatic luminance control is to protect the picture tube by limiting the beam current.

In picture-in-picture (PIP) systems, two pictures are displayed simultaneously on one television screen by overlaying a smaller, secondary picture on a main picture. A problem with PIP systems is that a bright secondary picture often causes the automatic luminance control system to reduce the brightness of the main picture. As a result, the picture is properly adjusted for the brightness of the secondary picture, but this adjustment is often too dark for the main picture.

Therefore, there is a need for a circuit for controlling luminance signal amplitudes to control the brightness of the image in the main picture effectively independently of the brightness of the image in the secondary picture.

SUMMARY OF THE INVENTION

It is an object of the present invention to create a circuit to control the luminance signal amplitude in video systems, and thus picture brightness. Especially in the case of picture-in-picture systems, the inventive circuit controls the brightness of the main picture, independent of and uninfluenced by the brightness of a secondary or mini-picture which is cut into the main picture.

The first device may include a first counter to count the pixels in a line which exceed a prescribed luminance threshold, and a second counter to count the lines in a picture, in which the status of the first counter exceeds a certain pixel-number threshold. The first device may also include a third counter to count the pictures in which the status of the second counter exceeds a line-number threshold.

The invention is especially based on the insight that the picture shown on a screen is shown too bright (i.e., a viewer perceives it as too bright), if more than a certain number of pixels have a luminance which is greater than a specific peak value, and if this condition prevails in more than a certain number of lines in a picture and in more than a certain number of successive pictures.

The circuit is preferably implemented as a digital circuit, and as part of the (digital) picture-in-picture subassembly.

The first device may include a compare the luminance of a pixel with a luminance threshold, the first comparator then actuating the first counter. The first device may also include a second comparator to compare the counter status of the first counter with the pixel number threshold, the second comparator then actuating the second counter. In addition, the first device may include a third comparator to compare the counter status of the second counter with the line number threshold, the third comparator then actuating the third counter, in such a fashion that its status is incremented by one if the status of the second counter exceeds the line number threshold, and is decremented by one if the status of the second counter falls below this threshold.

The second device preferably includes a fourth comparator and a unit to create incrementally increased or reduced luminances, if the counter status of the third counter exceeds a first limit value FLDO or falls below a second limit value FLDU. In particular, the first limit value FLDO can have a value +2, and the second limit value FLDU can be negative.

The luminance threshold and the first two limit values FLDO and FLDU preferably are set through a bus, so as to afford optimal adaptation to the TV system.

Further details, features, and advantages of the invention will be apparent from the following description of a preferred embodiment, in terms of the drawing.

BRIEF DISCUSSION OF THE DRAWING

The FIGURE is a block diagram illustration of a preferred embodiment of the invention.

DETAILED DISCRIPTION OF THE INVENTION

The FIGURE illustrated a block diagram illustration of a circuit for controlling luminance signal values. The circuit includes an adder 10 that includes an input that receives the luminance signals of the image pixels $Y_{IN}$, an inverting second input that receives an incremental luminance $Y_{INKR}$.

The output of the adder is connected to a first comparator 11, which compares the luminance of a pixel with a luminance threshold (e.g., seven bit peak value), which can be set through a bus ($I^2C$ bus, not shown). Furthermore, a clock pulse signal CLKLMC is applied to the first comparator 11, which is matched to the input signal $Y_{IN}$.

The output of the first comparator 11 is connected to a first counter 12. The comparator increments the counter status by one if the luminance of a pixel exceeds the luminance threshold.

The status of the first counter 12 is evaluated by a second comparator 13, which increments the status of a subsequent second counter 14 by one, if the status of the first counter 12 exceeds a threshold of the pixel number, that is if more than sixty-four (64) pixels are present in one line, whose luminance exceeds the luminance threshold.

The first counter 12 and the second comparator 13 are reset or configured by a signal LINE1 at the end of each active line.

The value of the second counter 14 indicates the number of lines in a picture, in which the luminance of more than sixty-four pixels exceeds the luminance thresholds. This number of lines is evaluated by a third comparator 15, which increments a subsequent third (picture) counter 16 by one, if the number of lines exceeds the value sixteen (16) (line number threshold), and it decrements this counter by one, if the number of lines is less than the line number threshold.

A fourth comparator 17 determines whether this number is greater than a first limit value FLDO (first criterion) or smaller than a second limit value FLDU (second criterion). The first limit value FLDO is here generally different from the second limit value FLDU. The limit value FLDO can be set through a bus ($I^2C$ bus).

If the status of the third counter 16 fulfills the first criterion of the fourth comparator 17, a unit 18 increases the incremental luminance. On the other hand, if the counter 16 status fulfills the second criterion, the incremental luminance is reduced. The output signal of the unit 18 is fed back via a limiter 19 and a register 20 to the second input of the adder 10. The limiter 19 prevents the luminance from being less than zero or greater than a fixed prescribed value. The step width $Y_{SCHRITT}$ of the increment or decrement of the luminance is a positive integer.

The second counter 14, the third comparator 15, the fourth comparator 17, and the register 20 are reset and configured by a signal VFLD at the end of each picture (or half-picture in interlaced operation).

The first counter 12 (pixel counter) and the second counter 14 (line counter) operate as absolute value counters, while the third counter (picture or half-picture counter) operates from −N to N−1, where N is a positive natural number.

The uncorrected luminance signal $Y_{IN}$ applied to the adder 10, and the corrected luminance signal applied to the output of the adder, are both conducted to a switch 21 that can be actuated by a switching signal S. The switch allows the circuit of the present invention to be selectively enabled/disabled. Depending on the switch position chosen by the switch signal, either the corrected or uncorrected luminance signal $Y_{OUT}$ is present at the output of the switch 21. This is conducted to further, generally known, signal processing steps.

In supplementary fashion, it should be noted that the output signal of the register 20 optionally can be used to indicate the degree of brightness reduction. The signal takeoff point needed for this is designated by P in the figure. This signal may be used to adapt the color saturation to the reduced luminance.

What is claimed is:

1. A circuit for controlling luminance-signal amplitudes, for application in a video system, comprising:

a first device to determine the brightness of a picture according to the number of pixels exceeding or falling below a defined brightness threshold in successive pictures, and by a second device for incrementing or decrementing the luminance-signal amplitude of the picture being presented, characterized in that the first device comprises a first counter to count the pixels in a line which exceed a prescribed luminance threshold, a second counter to count the lines in a picture, in which the status of the first counter exceeds a certain pixel-number threshold, and a third counter to count the pictures in which the status of the second counter exceeds a line-number threshold, such that the second device increments or decrements the luminance-signal amplitude, if the status of the third counter exceeds or falls below the picture-number threshold until, starting from the picture brightness determined in the first device, the specified brightness threshold is reached at least approximately.

2. The circuit of claim 1, wherein the first device includes a comparator to compare the luminance of a pixel with a luminance threshold, the first comparator then actuating the first counter.

3. The circuit of claim 2, wherein the luminance threshold value can be set through a bus.

4. The circuit of claim 3, wherein the first device includes a second comparator to compare the counter status of the first counter with the pixel number threshold, the second comparator then actuating the second counter.

5. The circuit of claim 4, wherein the pixel number threshold can be set through a bus.

6. The circuit of claim 5, wherein the first device includes a third comparator to compare the counter status of the second counter with the line number threshold, the third comparator then actuating the third counter, in such a fashion that its status is incremented by one if the status of the second counter exceeds the line number threshold, and is decremented by one if the status of said second counter falls below this threshold.

7. The circuit of claim 6, wherein the line number threshold can be set through a bus.

8. The circuit of claim 7, wherein the second device includes a fourth comparator and a unit to create incrementally increased or reduced luminances, if the counter status of the third counter exceeds a first limit value FLDO or falls below a second limit value FLDU.

9. The circuit of claim 8, wherein the first limit value FLDO and/or the second limit value FLDU can be set through a bus.

10. The circuit of claim 9, comprising a limiter connected to the output of the unit to create an incrementally increased or decreased luminance to limit the incremental luminance to a value between zero and a positive integer.

11. The circuit of claim 10, characterized in that the second device has an adder, into which an uncorrected luminance signal $Y_{IN}$ and, as a correcting variable, the incremental luminance $Y_{INKR}$ are inputted, and whose output is connected to the first comparator.

12. The circuit of claim 10, wherein said circuit is configured and arranged to be implemented as part of an integrated picture-in-picture circuit.

13. The circuit of claim 10, wherein the first counter comprises an absolute-value counter.

14. The circuit of claim 10 wherein the second counter comprises an absolute-value counter.

15. The circuit of claim 10 wherein the third counter comprises a counter configured to count between −N and N−1.

16. A circuit for controlling luminance-signal amplitudes, for use in a video display system, said circuit comprising:

means for determining the brightness of a plurality of pictures for display on the video display system, comprising (i) first means responsive to each of the plurality of pictures, for counting the pixels in a line which exceed a prescribed luminance threshold, and for providing a first count signal indicative thereof;

(ii) second means responsive to said first count signal, for counting the lines in a picture in which the value of said first signal exceeds a certain pixel-number threshold, and for providing a second count signal indicative thereof;

(iii) third means responsive to said second count signal, for counting the pictures in which the value of said second count signal exceeds a line-number threshold, and for providing a third count signal indicative thereof; and means for adjusting luminance-signal amplitude if the value of said third count signal falls outside a picture-number threshold.

17. A circuit for controlling luminance signal amplitude of a bit mapped display, comprising:

means for determining the brightness of a plurality of bit mapped images for display on the video display system, comprising (i) first means responsive to each of the plurality of bit mapped images that each include digitized pixel luminance-signal amplitude data, for counting the pixels in a line which exceed a prescribed luminance threshold, and for providing a first count signal indicative thereof;

(ii) second means responsive to said first count signal, for counting the lines in at least one of said plurality of bit mapped images in which the value of said first signal exceeds a certain pixel-number threshold, and for providing a second count signal indicative thereof;

(iii) third means responsive to said second count signal, for counting the number of said plurality of bit mapped images in which the value of said second count signal exceeds a line-number threshold, and for providing a third count signal indicative thereof; and means responsive to digitized pixel luminance-signal amplitudes, for applying a brightness correction bias to said digitized luminance-signal amplitudes if the value of said third count signal falls outside a picture-number threshold.

* * * * *